US008864586B2

(12) United States Patent
Nguyen

(10) Patent No.: US 8,864,586 B2
(45) Date of Patent: Oct. 21, 2014

(54) GAMING SYSTEMS INCLUDING VIRAL GAMING EVENTS

(75) Inventor: Binh T. Nguyen, Reno, NV (US)

(73) Assignee: Nguyen Gaming LLC, Reno, NV (US)

( * ) Notice: Subject to any disclaimer, the term of this patent is extended or adjusted under 35 U.S.C. 154(b) by 368 days.

(21) Appl. No.: 12/617,717

(22) Filed: Nov. 12, 2009

(65) Prior Publication Data

US 2011/0111860 A1 May 12, 2011

(51) Int. Cl.
*A63F 13/12* (2006.01)
*G07F 17/32* (2006.01)

(52) U.S. Cl.
CPC ............ *G07F 17/3244* (2013.01); *G07F 17/32* (2013.01)
USPC ............................................................ 463/42

(58) Field of Classification Search
CPC ......................... G07F 17/3883; G07F 17/3267
USPC ................................ 463/1, 16, 29, 25, 40–42
See application file for complete search history.

(56) References Cited

U.S. PATENT DOCUMENTS

| | | | |
|---|---|---|---|
| 2,033,638 A | | 3/1936 | Koppl |
| 2,062,923 A | | 12/1936 | Nagy |
| 4,741,539 A | | 5/1988 | Sutton et al. |
| 4,948,138 A | | 8/1990 | Pease et al. |
| 5,067,712 A | | 11/1991 | Georgilas |
| 5,429,361 A | | 7/1995 | Raven et al. |
| 5,655,961 A | * | 8/1997 | Acres et al. ..................... 463/25 |
| 5,704,835 A | | 1/1998 | Dietz, II |
| 5,727,786 A | | 3/1998 | Weingardt |
| 5,833,537 A | | 11/1998 | Barrie |
| 5,919,091 A | | 7/1999 | Bell et al. |
| 5,947,820 A | | 9/1999 | Morro et al. |
| 5,997,401 A | | 12/1999 | Crawford |
| 6,001,016 A | | 12/1999 | Walker et al. |
| 6,039,648 A | | 3/2000 | Guinn et al. |
| 6,059,289 A | | 5/2000 | Vancura |
| 6,089,977 A | | 7/2000 | Bennett |
| 6,095,920 A | | 8/2000 | Sudahiro |
| 6,110,041 A | | 8/2000 | Walker et al. |

(Continued)

FOREIGN PATENT DOCUMENTS

| | | |
|---|---|---|
| GB | 2033638 | 5/1980 |
| GB | 2062923 | 5/1981 |

(Continued)

OTHER PUBLICATIONS

Benston, Liz, "Harrahs Launches iPhone App; Caesars Bypasses Check-in, Las Vegas Sun, Las Vegas, NV."Jan. 8, 2010.

(Continued)

*Primary Examiner* — Damon Pierce

(57) ABSTRACT

Gaming machines and systems are configured to present viral gaming events. Once a viral gaming event is triggered, it is presented at one or more first gaming machines at a first time. The viral gaming events spreads to other gaming machines, such as one or more second gaming machines where it is presented at a later time. The viral gaming event may continue to spread to numerous gaming machines. The viral gaming event may comprise a game or a bonus or secondary event, such as a bonus award event to a base wagering game presented by the gaming machine. Feedback or metrics may be used to control the machines to which the viral gaming event spreads and/or the rate of spread.

25 Claims, 3 Drawing Sheets

(56) References Cited

U.S. PATENT DOCUMENTS 6,142,872 A 11/2000 Walker et al.
6,146,273 A 11/2000 Olsen
6,165,071 A 12/2000 Weiss
6,231,445 B1 5/2001 Acres
6,270,412 B1 8/2001 Crawford et al.
6,290,600 B1 9/2001 Glasson
6,293,866 B1 9/2001 Walker et al.
6,353,390 B1 3/2002 Beri et al.
6,364,768 B1 * 4/2002 Acres et al. .................... 463/25
6,416,406 B1 7/2002 Duhamel
6,416,409 B1 7/2002 Jordan
6,443,452 B1 9/2002 Brune
6,491,584 B2 12/2002 Graham et al.
6,505,095 B1 1/2003 Kolls
6,508,710 B1 1/2003 Paravia et al.
6,561,900 B1 5/2003 Baerlocher et al.
6,592,457 B1 7/2003 Frohm et al.
6,612,574 B1 9/2003 Cole et al.
6,620,046 B2 9/2003 Rowe
6,641,477 B1 11/2003 Dietz, II
6,645,078 B1 11/2003 Mattice
6,719,630 B1 4/2004 Seelig et al.
6,749,510 B2 * 6/2004 Giobbi ............................ 463/42
6,758,757 B2 7/2004 Luciano, Jr. et al.
6,773,345 B2 8/2004 Walker et al.
6,778,820 B2 8/2004 Tendler
6,780,111 B2 8/2004 Cannon et al.
6,799,032 B2 9/2004 McDonnell et al.
6,800,027 B2 10/2004 Giobbi et al.
6,804,763 B1 10/2004 Stockdale et al.
6,811,486 B1 11/2004 Luciano, Jr.
6,843,725 B2 1/2005 Nelson
6,846,238 B2 1/2005 Wells
6,848,995 B1 2/2005 Walker et al.
6,852,029 B2 2/2005 Baltz et al.
6,869,361 B2 3/2005 Sharpless et al.
6,875,106 B2 4/2005 Weiss et al.
6,884,170 B2 4/2005 Rowe
6,884,172 B1 4/2005 Lloyd et al.
6,902,484 B2 6/2005 Idaka
6,908,390 B2 6/2005 Nguyen et al.
6,913,532 B2 7/2005 Bearlocher et al.
6,923,721 B2 8/2005 Luciano et al.
6,935,958 B2 8/2005 Nelson
6,955,600 B2 10/2005 Glavich et al.
6,971,956 B2 12/2005 Rowe et al.
6,984,174 B2 1/2006 Cannon et al.
6,997,803 B2 2/2006 LeMay et al.
7,018,292 B2 3/2006 Tracy et al.
7,033,276 B2 4/2006 Walker et al.
7,035,626 B1 4/2006 Luciano
7,037,195 B2 5/2006 Schneider et al.
7,048,628 B2 5/2006 Schneider
7,048,630 B2 5/2006 Berg et al.
7,063,617 B2 6/2006 Brosnan et al.
7,076,329 B1 7/2006 Kolls
7,089,264 B1 8/2006 Guido et al.
7,094,148 B2 8/2006 Bearlocher et al.
7,105,736 B2 9/2006 Laakso
7,111,141 B2 9/2006 Nelson
7,144,321 B2 12/2006 Mayeroff
7,152,783 B2 12/2006 Charrin
7,169,041 B2 1/2007 Tessmer et al.
7,169,052 B2 1/2007 Beaulieu et al.
7,175,523 B2 2/2007 Gilmore et al.
7,181,228 B2 2/2007 Boesch
7,182,690 B2 2/2007 Giobbi et al.
RE39,644 E 5/2007 Alcorn et al.
7,243,104 B2 7/2007 Bill
7,247,098 B1 7/2007 Bradford et al.
7,259,718 B2 8/2007 Patterson et al.
7,275,989 B2 10/2007 Moody
7,285,047 B2 10/2007 Gielb et al.
7,314,408 B2 1/2008 Cannon et al.
7,316,615 B2 1/2008 Soltys et al.
7,316,619 B2 1/2008 Nelson
7,318,775 B2 1/2008 Brosnan et al.
7,326,116 B2 2/2008 O'Donovan et al.
7,330,108 B2 2/2008 Thomas
7,346,358 B2 3/2008 Wood et al.
7,355,112 B2 4/2008 Laakso
7,384,338 B2 6/2008 Rothschild et al.
7,387,571 B2 6/2008 Walker et al.
7,393,278 B2 7/2008 Gerson et al.
7,396,990 B2 7/2008 Lu et al.
7,415,426 B2 8/2008 Williams et al.
7,425,177 B2 9/2008 Rodgers et al.
7,427,234 B2 9/2008 Soltys et al.
7,427,236 B2 9/2008 Kaminkow et al.
7,427,708 B2 9/2008 Ohmura
7,448,949 B2 11/2008 Kaminkow et al.
7,500,913 B2 3/2009 Baerlocher
7,510,474 B2 3/2009 Carter
7,513,828 B2 4/2009 Nguyen et al.
7,559,838 B2 7/2009 Walker et al.
7,563,167 B2 7/2009 Walker et al.
7,572,183 B2 8/2009 Olivas et al.
7,585,222 B2 9/2009 Muir
7,602,298 B2 10/2009 Thomas
7,607,174 B1 10/2009 Kashchenko et al.
7,611,409 B2 11/2009 Muir et al.
7,637,810 B2 12/2009 Amaitis et al.
7,644,861 B2 1/2010 Alderucci et al.
7,699,703 B2 4/2010 Muir et al.
7,722,453 B2 5/2010 Lark et al.
7,758,423 B2 * 7/2010 Foster et al. .................... 463/42
7,771,271 B2 8/2010 Walker et al.
7,780,529 B2 8/2010 Rowe et al.
7,780,531 B2 8/2010 Englman et al.
7,785,192 B2 8/2010 Canterbury et al.
7,811,172 B2 10/2010 Asher et al.
7,822,688 B2 10/2010 Labron
7,828,652 B2 11/2010 Nguyen et al.
7,828,654 B2 11/2010 Carter
7,850,528 B2 12/2010 Wells
7,874,919 B2 1/2011 Paulsen et al.
7,877,798 B2 1/2011 Saunders et al.
7,883,413 B2 2/2011 Paulsen
7,892,097 B2 2/2011 Muir et al.
7,909,692 B2 3/2011 Nguyen et al.
7,909,699 B2 3/2011 Parrott et al.
7,918,728 B2 4/2011 Nguyen et al.
7,927,211 B2 4/2011 Rowe et al.
7,927,212 B2 4/2011 Hedrick et al.
7,951,008 B2 5/2011 Wolf et al.
8,057,298 B2 11/2011 Nguyen et al.
8,057,303 B2 11/2011 Rasmussen et al.
8,087,988 B2 1/2012 Nguyen et al.
8,226,459 B2 7/2012 Barrett
8,226,474 B2 7/2012 Nguyen et al.
8,231,456 B2 7/2012 Zielinski
8,235,803 B2 8/2012 Loose et al.
8,282,475 B2 10/2012 Nguyen et al.
8,323,099 B2 12/2012 Durham et al.
8,337,290 B2 12/2012 Nguyen et al.
2002/0042295 A1 * 4/2002 Walker et al. ................... 463/20
2002/0111210 A1 8/2002 Luciano, Jr. et al.
2002/0111213 A1 8/2002 McEntee et al.
2002/0113369 A1 8/2002 Weingardt
2002/0133418 A1 9/2002 Hammond et al.
2002/0142825 A1 10/2002 Lark et al.
2002/0147047 A1 10/2002 Letovsky et al.
2002/0147049 A1 10/2002 Carter, Sr.
2002/0151366 A1 10/2002 Walker et al.
2002/0167536 A1 11/2002 Valdes et al.
2002/0183105 A1 12/2002 Cannon et al.
2003/0001338 A1 1/2003 Bennett et al.
2003/0008696 A1 1/2003 Abecassis et al.
2003/0027635 A1 2/2003 Walker et al.
2003/0064805 A1 4/2003 Wells
2003/0064807 A1 4/2003 Walker et al.
2003/0092480 A1 5/2003 White et al.
2003/0100361 A1 * 5/2003 Sharpless et al. ............... 463/25
2003/0104865 A1 6/2003 Itkis et al.

(56) References Cited

U.S. PATENT DOCUMENTS

| | | | | |
|---|---|---|---|---|
| 2003/0162588 | A1 | 8/2003 | Brosnan et al. | |
| 2003/0199295 | A1 | 10/2003 | Vancura | |
| 2003/0224852 | A1 | 12/2003 | Walker et al. | |
| 2003/0224854 | A1 | 12/2003 | Joao | |
| 2004/0002386 | A1 | 1/2004 | Wolfe et al. | |
| 2004/0005919 | A1* | 1/2004 | Walker et al. | 463/23 |
| 2004/0023709 | A1 | 2/2004 | Beaulieu et al. | |
| 2004/0023716 | A1 | 2/2004 | Gauselmann | |
| 2004/0048650 | A1 | 3/2004 | Mierau et al. | |
| 2004/0082385 | A1 | 4/2004 | Silva et al. | |
| 2004/0106449 | A1 | 6/2004 | Walker et al. | |
| 2004/0127290 | A1 | 7/2004 | Walker et al. | |
| 2004/0137987 | A1 | 7/2004 | Nguyen et al. | |
| 2004/0147308 | A1 | 7/2004 | Walker et al. | |
| 2004/0224753 | A1 | 11/2004 | O'Donovan et al. | |
| 2004/0256803 | A1 | 12/2004 | Ko | |
| 2005/0003890 | A1 | 1/2005 | Hedrick et al. | |
| 2005/0004980 | A1 | 1/2005 | Vadjinia | |
| 2005/0101376 | A1 | 5/2005 | Walker et al. | |
| 2005/0101383 | A1 | 5/2005 | Wells | |
| 2005/0130728 | A1 | 6/2005 | Nguyen et al. | |
| 2005/0181870 | A1 | 8/2005 | Nguyen et al. | |
| 2005/0187020 | A1 | 8/2005 | Amaitis et al. | |
| 2005/0277471 | A1 | 12/2005 | Russell et al. | |
| 2006/0009283 | A1 | 1/2006 | Englman et al. | |
| 2006/0046822 | A1 | 3/2006 | Kaminkow et al. | |
| 2006/0046830 | A1 | 3/2006 | Webb | |
| 2006/0046849 | A1 | 3/2006 | Kovacs | |
| 2006/0068893 | A1 | 3/2006 | Jaffe et al. | |
| 2006/0073869 | A1 | 4/2006 | LeMay et al. | |
| 2006/0073897 | A1 | 4/2006 | Englman et al. | |
| 2006/0148551 | A1* | 7/2006 | Walker et al. | 463/16 |
| 2006/0189382 | A1 | 8/2006 | Muir et al. | |
| 2006/0217193 | A1 | 9/2006 | Walker et al. | |
| 2006/0247028 | A1 | 11/2006 | Brosnan et al. | |
| 2006/0247035 | A1 | 11/2006 | Rowe et al. | |
| 2006/0252530 | A1 | 11/2006 | Oberberger et al. | |
| 2006/0253481 | A1 | 11/2006 | Guido et al. | |
| 2006/0281525 | A1 | 12/2006 | Borissov | |
| 2006/0281541 | A1 | 12/2006 | Nguyen et al. | |
| 2007/0004510 | A1 | 1/2007 | Underdahl et al. | |
| 2007/0060254 | A1 | 3/2007 | Muir | |
| 2007/0060358 | A1 | 3/2007 | Amaitas et al. | |
| 2007/0077981 | A1 | 4/2007 | Hungate et al. | |
| 2007/0087833 | A1 | 4/2007 | Feeney et al. | |
| 2007/0087834 | A1 | 4/2007 | Moser et al. | |
| 2007/0149286 | A1 | 6/2007 | Bemmel | |
| 2007/0159301 | A1 | 7/2007 | Hirt et al. | |
| 2007/0161402 | A1 | 7/2007 | Ng. et al. | |
| 2007/0184904 | A1 | 8/2007 | Lee | |
| 2007/0191109 | A1 | 8/2007 | Crowder et al. | |
| 2007/0207852 | A1 | 9/2007 | Nelson et al. | |
| 2007/0207854 | A1 | 9/2007 | Wolf et al. | |
| 2007/0241187 | A1 | 10/2007 | Alderucci et al. | |
| 2007/0248036 | A1 | 10/2007 | Nevalainen | |
| 2007/0257430 | A1 | 11/2007 | Hardy et al. | |
| 2007/0259713 | A1 | 11/2007 | Fiden et al. | |
| 2007/0259717 | A1 | 11/2007 | Mattice et al. | |
| 2007/0270213 | A1 | 11/2007 | Nguyen et al. | |
| 2007/0275777 | A1 | 11/2007 | Walker et al. | |
| 2007/0275779 | A1 | 11/2007 | Amaitis et al. | |
| 2007/0281782 | A1 | 12/2007 | Amaitis et al. | |
| 2007/0281785 | A1 | 12/2007 | Amaitas et al. | |
| 2007/0298873 | A1 | 12/2007 | Nguyen et al. | |
| 2008/0015032 | A1 | 1/2008 | Bradford et al. | |
| 2008/0020824 | A1 | 1/2008 | Cuddy et al. | |
| 2008/0032787 | A1 | 2/2008 | Low et al. | |
| 2008/0070652 | A1 | 3/2008 | Nguyen et al. | |
| 2008/0070681 | A1 | 3/2008 | Marks et al. | |
| 2008/0076506 | A1 | 3/2008 | Nguyen et al. | |
| 2008/0076548 | A1 | 3/2008 | Paulsen | |
| 2008/0076572 | A1 | 3/2008 | Nguyen et al. | |
| 2008/0096650 | A1 | 4/2008 | Baerlocher | |
| 2008/0102956 | A1 | 5/2008 | Burman et al. | |
| 2008/0102957 | A1 | 5/2008 | Burnman et al. | |
| 2008/0113772 | A1 | 5/2008 | Burrill et al. | |
| 2008/0119267 | A1 | 5/2008 | Denlay | |
| 2008/0146321 | A1 | 6/2008 | Parente | |
| 2008/0150902 | A1 | 6/2008 | Edpalm et al. | |
| 2008/0153583 | A1 | 6/2008 | Huntley et al. | |
| 2008/0167106 | A1 | 7/2008 | Lutnick et al. | |
| 2008/0182667 | A1 | 7/2008 | Davis et al. | |
| 2008/0207307 | A1 | 8/2008 | Cunningham, II et al. | |
| 2008/0214258 | A1 | 9/2008 | Brosnan et al. | |
| 2008/0238610 | A1 | 10/2008 | Rosenberg | |
| 2008/0254878 | A1 | 10/2008 | Sauders et al. | |
| 2008/0254881 | A1 | 10/2008 | Lutnick et al. | |
| 2008/0254891 | A1 | 10/2008 | Sauders et al. | |
| 2008/0254892 | A1 | 10/2008 | Sauders et al. | |
| 2008/0254897 | A1 | 10/2008 | Sauders et al. | |
| 2008/0300058 | A1 | 12/2008 | Sum et al. | |
| 2008/0305864 | A1 | 12/2008 | Kelly et al. | |
| 2008/0305865 | A1 | 12/2008 | Kelly et al. | |
| 2008/0305866 | A1 | 12/2008 | Kelly et al. | |
| 2008/0311994 | A1 | 12/2008 | Amaitas et al. | |
| 2008/0318686 | A1 | 12/2008 | Crowder et al. | |
| 2009/0005165 | A1 | 1/2009 | Arezina et al. | |
| 2009/0029766 | A1 | 1/2009 | Lutnick et al. | |
| 2009/0054149 | A1 | 2/2009 | Brosnan et al. | |
| 2009/0088258 | A1 | 4/2009 | Saunders et al. | |
| 2009/0098925 | A1 | 4/2009 | Gagner et al. | |
| 2009/0104977 | A1 | 4/2009 | Zielinski | |
| 2009/0104983 | A1 | 4/2009 | Okada | |
| 2009/0118013 | A1 | 5/2009 | Finnimore et al. | |
| 2009/0118022 | A1 | 5/2009 | Lyons et al. | |
| 2009/0124366 | A1 | 5/2009 | Aoki et al. | |
| 2009/0131151 | A1 | 5/2009 | Harris et al. | |
| 2009/0132163 | A1 | 5/2009 | Ashley et al. | |
| 2009/0137255 | A1 | 5/2009 | Ashley et al. | |
| 2009/0149245 | A1 | 6/2009 | Fabbri | |
| 2009/0149261 | A1 | 6/2009 | Chen et al. | |
| 2009/0156303 | A1 | 6/2009 | Kiely et al. | |
| 2009/0176578 | A1 | 7/2009 | Herrmann et al. | |
| 2009/0191962 | A1 | 7/2009 | Hardy et al. | |
| 2009/0197684 | A1 | 8/2009 | Arezina et al. | |
| 2009/0216547 | A1 | 8/2009 | Canora et al. | |
| 2009/0219901 | A1 | 9/2009 | Bull et al. | |
| 2009/0221342 | A1 | 9/2009 | Katz et al. | |
| 2009/0227302 | A1 | 9/2009 | Abe | |
| 2009/0239666 | A1* | 9/2009 | Hall et al. | 463/42 |
| 2009/0264190 | A1 | 10/2009 | Davis et al. | |
| 2010/0002897 | A1 | 1/2010 | Keady | |
| 2010/0004058 | A1 | 1/2010 | Acres | |
| 2010/0056248 | A1 | 3/2010 | Acres | |
| 2010/0062833 | A1 | 3/2010 | Mattice et al. | |
| 2010/0081501 | A1 | 4/2010 | Carpenter et al. | |
| 2010/0099499 | A1 | 4/2010 | Amaitis et al. | |
| 2010/0124967 | A1 | 5/2010 | Lutnick et al. | |
| 2010/0160043 | A1* | 6/2010 | Fujimoto et al. | 463/35 |
| 2010/0197383 | A1 | 8/2010 | Rader et al. | |
| 2010/0227670 | A1 | 9/2010 | Arezina et al. | |
| 2010/0234091 | A1 | 9/2010 | Baerlocher et al. | |
| 2010/0323780 | A1 | 12/2010 | Acres | |
| 2011/0039615 | A1 | 2/2011 | Acres | |
| 2011/0065492 | A1 | 3/2011 | Acres | |
| 2011/0111827 | A1 | 5/2011 | Nicely et al. | |
| 2011/0111860 | A1 | 5/2011 | Nguyen | |
| 2011/0118010 | A1 | 5/2011 | Brune | |
| 2011/0212711 | A1 | 9/2011 | Scott | |
| 2011/0223993 | A1* | 9/2011 | Allen et al. | 463/42 |
| 2011/0263318 | A1 | 10/2011 | Agarwal et al. | |
| 2011/0306400 | A1 | 12/2011 | Nguyen | |
| 2012/0015709 | A1 | 1/2012 | Bennett et al. | |
| 2012/0034968 | A1 | 2/2012 | Watlins et al. | |
| 2012/0094769 | A1 | 4/2012 | Nguyen et al. | |
| 2012/0108319 | A1 | 5/2012 | Caputo et al. | |
| 2012/0122567 | A1 | 5/2012 | Gangadharan et al. | |
| 2012/0122584 | A1 | 5/2012 | Nguyen | |
| 2012/0122590 | A1 | 5/2012 | Nguyen | |
| 2012/0172130 | A1 | 7/2012 | Acres | |
| 2012/0190426 | A1 | 7/2012 | Acres | |
| 2012/0194448 | A1 | 8/2012 | Rothkopf | |
| 2012/0208618 | A1 | 8/2012 | Frerking | |
| 2012/0322563 | A1 | 12/2012 | Nguyen et al. | |

(56) References Cited

U.S. PATENT DOCUMENTS

| | | | |
|---|---|---|---|
| 2012/0330740 A1 | 12/2012 | Pennington et al. |
| 2013/0005433 A1 | 1/2013 | Holch |
| 2013/0005453 A1 | 1/2013 | Nguyen et al. |
| 2013/0059650 A1 | 3/2013 | Sylla et al. |
| 2013/0065668 A1 | 3/2013 | LeMay et al. |
| 2013/0196776 A1 | 8/2013 | Nguyen |
| 2013/0210513 A1 | 8/2013 | Nguyen |
| 2013/0210514 A1 | 8/2013 | Nguyen |
| 2013/0210530 A1 | 8/2013 | Nguyen |

FOREIGN PATENT DOCUMENTS

| | | |
|---|---|---|
| GB | 2096376 | 10/1982 |
| GB | 2097570 | 11/1982 |
| GB | 2335524 | 9/1999 |
| GB | 12005000454 | 5/2007 |
| WO | WO 05073933 | 8/2005 |
| WO | WO 2008/027621 | 3/2008 |
| WO | WO 2009/026309 | 2/2009 |
| WO | WO 2009/062148 | 5/2009 |
| WO | WO 2010/017252 A1 | 8/2009 |

OTHER PUBLICATIONS

Finnegan, Amanda, "Casinos Connecting with Customers via Iphone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian,"Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Ilinois at Urbana Champain, Jun. 27, 2005.
Jones, Trahern, "Telecon-equipped drones could revolutionize wireless market", azcentral.com, http://www.azcentral.com/business/news/articles/20130424telecomequipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
iAPS, Daily Systems LLC, 2010.
U.S. Appl. No. 12/945,888 filed Nov. 14, 2010.
U.S. Appl. No. 12/945,889 filed on Nov. 14, 2010.
U.S. Appl. No. 13/622,702 filed Sep. 19, 2012.
U.S. Appl. No. 13/800,917, filed Mar. 13, 2013.
U.S. Appl. No. 13/296,182 filed Nov. 15, 2011.
U.S. Appl. No. 13/801,234 filed Mar. 13, 2013.
U.S. Appl. No. 13/801,171 filed Mar. 13, 2013.
U.S. Appl. No. 13/843,192 filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672 filed Nov. 16, 2009.
U.S. Appl. No. 13/801,121, filed Mar. 13, 2013.
U.S. Appl. No. 12/581,115 filed Oct. 17, 2009.
U.S. Appl. No. 13/801,076 filed Mar. 13, 2013.
U.S. Appl. No. 13/617,717 filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256 filed Mar. 13, 2013.
U.S. Appl. No. 12/757,968, filed Apr. 9, 2010.
U.S. Appl. No. 12/797,616 filed Jun. 10, 2010.
U.S. Appl. No. 13/557,063 filed Jul. 24, 2012.
U.S. Appl. No. 13/833,116 filed Mar. 15, 2013.
U.S. Appl. No. 13/801,271 filed Mar. 13, 2011.
Office Action for U.S. Appl. No. 12/945,888 dated Apr. 10, 2012.
Final Office Action for U.S. Appl. No. 12/945,888 dated Sep. 21, 2012.
Advisory Action for U.S. Application No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated Mar., 7, 2013.
Office Action for U.S. Appl. No. 12/617,717 dated Oct. 4, 2011.
Office Action for U.S. Appl. No. 12/617,717 dated Apr. 4, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.
Office Action for U.S. Appl. No. 13/296,182 dated Dec. 5, 2012.
Brochure, 5000 Ft. Inc., 1 p., Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Notice of Allowance of U.S. Appl. No. 12/619,672, mailed Aug. 23, 2013.
Office Action for U.S. Appl. No. 13/633,118, mailed Sep. 20, 2013.
Office Action for U.S. Appl. No. 13/801,256, mailed Jul. 2, 2013.
Notice of Allowance for U.S. Appl. No. 12/619,672, mailed Oct. 3, 2013.
Notice of Allowance for U.S. Appl. No. 12/757,968, mailed Oct. 11, 2013.
Final Office Action for U.S. Appl. No. 12/797,610, mailed Jul. 10, 2013.
Notice of Allowance for U.S. Appl. No. 12/757,968, mailed Dec. 18, 2013.
Office Action for U.S. Appl. No. 12/945,889, mailed Dec. 18, 2013.
Office Action for U.S. Appl. No. 13/632,828, mailed Jul. 30, 2013.
Restriction Requirement for U.S. Appl. No. 13/801,256, mailed Dec. 30, 2013.
Office Action for U.S. Appl. No. 13/801,171, mailed Dec. 26, 2013.
Office Action for U.S. Appl. No. 13/801,234, mailed Jan. 10, 2014.
Final Office Action for U.S. Appl. No. 13/296,182, mailed Feb. 12, 2014.
Office Action for U.S. Appl. No. 12/617,717, mailed Feb. 25, 2014.
Office Action for U.S. Appl. No. 13/801,076, mailed Mar. 28, 2014.
Final Office Action for U.S. Appl. No. 13/633,118, mailed Apr. 3, 2014.
Office Action for U.S. Appl. No. 13/843,192, mailed Apr. 3, 2014.
Office Action for U.S. Appl. No. 13/632,743, mailed Apr. 10, 2014.
Office Action for U.S. Appl. No. 13/801,121, mailed Apr. 11, 2014.

* cited by examiner

GAMING SYSTEMS INCLUDING VIRAL GAMING EVENTS

FIELD OF THE INVENTION

The present invention relates to games and game features, and particularly to wagering game events.

BACKGROUND OF THE INVENTION

Early gaming machines presented a single wagering game. For example, early slot machines presented a single game in which a set of reels were spun and the stopping positions of the reels define the outcome of the game. Later, video gaming machines were developed. These gaming machines were configured to present slot games in a video format, as well as other games such as video poker.

In order to increase the excitement associated with these games, various secondary game events have been developed. For example, gaming machines have been outfitted with rotating wheels. When a player receives a particular winning result of a base game, such as a particular slot reel outcome, the wheel may spin and stop on a segment which defines a bonus award. Similarly, video gaming machines have been configured to present various video secondary events. These events may comprise a variety of animated sequences which provide entertainment and the potential for awards.

Also, as gaming machines have been linked to gaming systems, awards have been developed which increase the number of participating players. For example, gaming machines may be linked to a jackpot system. If a player of one of the gaming machines of the system obtains a particular winning outcome, they may be awarded the jackpot. In order to increase the level of excitement of such a system, the players of other gaming machines at which the jackpot was not won may be awarded a consolation prize.

Still, these secondary events or awards have limitations, and new and exciting gaming events remain desirable.

SUMMARY OF THE INVENTION

The invention comprises viral gaming events and gaming machines and gaming systems configured to present viral gaming events.

In accordance with one aspect of the invention, a viral gaming event is triggered and is first presented at one or more first gaming machines at a time T1. The viral gaming event then spreads to one or more second gaming machines at a time T2 which is later than the time T1. The viral gaming event may comprise a gaming event such as a bonus event, or a non-gaming event such as a promotional message from the casino or an alert. The viral gaming event may be the same or different at each gaming machine. The viral gaming event may comprise a single player event (i.e. played by the player of the particular machine) or be a group event (wherein multiple players participate in the event).

The viral gaming event may be triggered in various fashions, such as a result of game play at a particular gaming machine, results or actions at multiple gaming machines, a result of a casino-operator action, or randomly. The viral gaming event might be initiated at a single gaming machine or multiple gaming machines. The viral gaming event may spread to multiple gaming machines, including not only one or more second gaming machines but one or more third, fourth, etc. gaming machines.

The viral gaming event preferably ceases to spread and has an end. The end may be defined by the award of a predetermined amount of bonus awards, the expiration of a time period, infection of a certain number of gaming machines or the like.

The viral gaming event may have various propagation patterns including direction of spread and rate of spread. The viral gaming event may spread in certain directions, may be spread to achieve desired game play goals, may spread randomly, and may spread based upon player qualification criteria or the like. The characteristics of the viral gaming event may be varied. For example, game play metrics obtained from a player tracking system or one or more cameras may be used to determine the particular gaming machines which are infected, the rate of spread or the like. Feedback may be provided during the viral gaming event to modify the characteristics of the event after it is triggered.

Information may be provided to players and potential players regarding infection of gaming machines with the viral gaming event and the spread thereof. Such alerts may comprise visual, audible or other alerts at infected gaming machines. Visual, audio or other information may also be provided regarding the direction of viral event propagation, such as digital signage or light pipes and ropes which illuminate to define paths of spread of the viral gaming event.

In one embodiment the viral gaming event may be implemented by gaming machines in a peer-to-peer networking environment. In another embodiment, a gaming system includes a plurality of gaming machines and at least one viral event server in communication with those gaming machines. The viral event server is preferably configured to spread the viral event to the gaming machines.

Further objects, features, and advantages of the present invention over the prior art will become apparent from the detailed description which follows, when considered with the figures provided herein.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises viral game events, methods of game play ("games") including such events, and gaming machines and systems configured to present such events or features. A viral gaming event of the invention comprises a gaming event, such as a bonus or secondary event, which spreads from one or more first gaming machines to one or more additional gaming machines.

Content associated with a viral game event could be a game feature such as a bonus, a game symbol, a message from the server, a promotional message from the casino, an informational alert, and the like. The viral game event could be implemented as a software module. The software module monitors game events, gathers data, views files, processes logic, displays animation, etc., at the gaming devices. In one implementation, the viral game software is a self-contained distributed software application that's constructed with popular programming and languages such as C, C++, Java, C#, Perl, Javascript, Python, etc. The software module is transferred to a gaming device for execution. In another implementation, the viral game event is built as a web service to be executed at a remote server.

Figure 1:
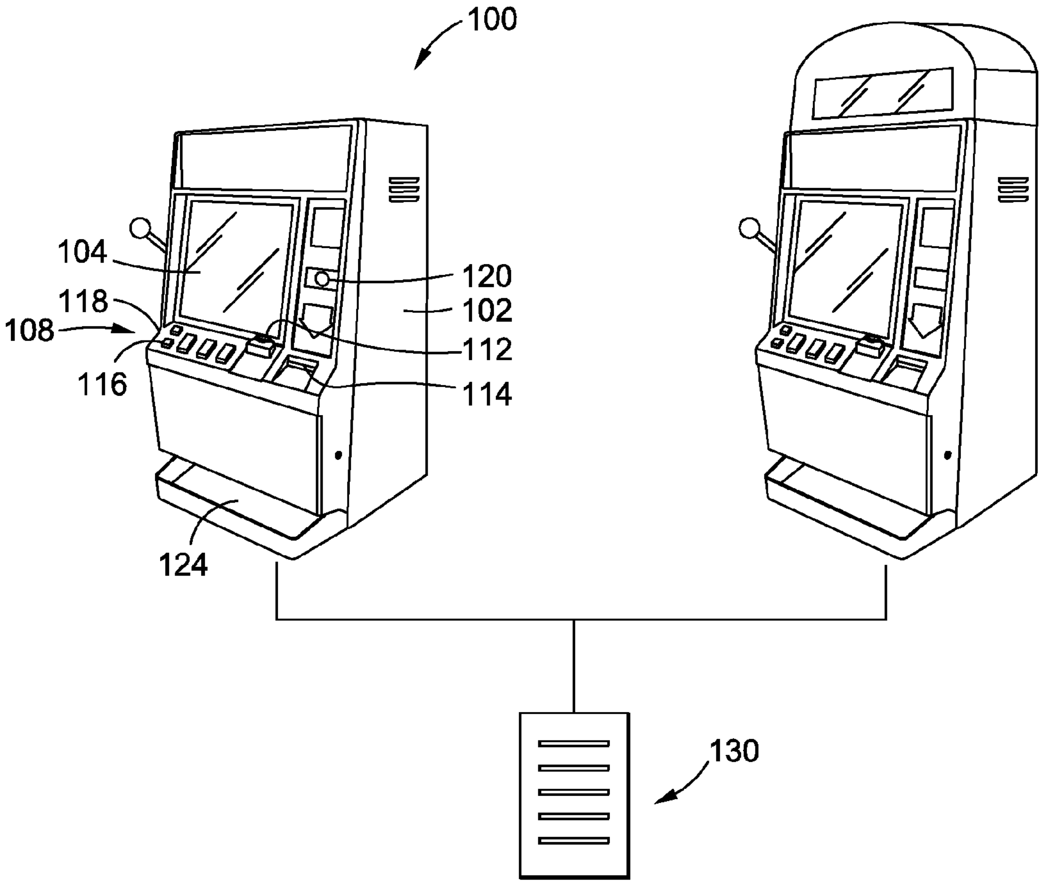
FIG. 1 illustrates gaming machines and a gaming system which may present a viral gaming event of the invention.

FIG. 1 illustrates one embodiment of a gaming machine or device 100 at which a viral gaming event or feature of the invention may be presented. The gaming machine 100 might be located in various environments, such as a casino.

In one embodiment, the gaming machine 100 defines a generally enclosed interior space for housing one or more components. As illustrated, the gaming machine 100 generally comprises a housing or cabinet 102 for supporting and/or enclosing various components required for operation of the gaming machine. In the embodiment illustrated, the housing 102 includes a door located at a front thereof, the door capable of being moved between an open position which allows access to the interior, and a closed position in which access to the interior is generally prevented. The configuration of the gaming machine 100 may vary. In the embodiment illustrated, the gaming machine 100 has an "upright" configuration. However, the gaming machine 100 could have other configurations, shapes or dimensions (such as being of a "slant"-type, "bar-top" or other configuration as is well known to those of skill in the art).

The gaming machine 100 preferably includes at least one display device 104 configured to display game information. The display device 104 may be a mechanical, electro-mechanical or electronic display, such as one or more rotating reels, a video display or the like. When the display device 104 is an electronic video display, it may comprise a cathode ray tube (CRT), high resolution flat panel liquid crystal display (LCD), projection LCD, plasma display, field emission display, digital micro-mirror display (DMD), digital light processing display (DLP), multilayer LCD display, an E-ink display, a light emitting display (LED, OLED) or other suitable displays now known or later developed, in a variety of resolutions, sizes and formats (e.g. 4:3, widescreen or the like). The display 104 may be capable of projecting or displaying a wide variety of information, including images, symbols and other indicia or information associated with game play, game promotion or other events. The gaming machine 100 may include two or more display devices. For example, a secondary display device might be associated with the housing or cabinet 102 along with the main display device 104, or might be associated with a top box or the like, as illustrated in FIG. 1.

The gaming machine 100 may be configured to present a wide variety of games. Such games might be Class III type games such as slot games and video poker games, or Class II type games such as bingo, pull-tab games, lotto or instant lottery style games. In one embodiment, certain game outcomes may be designated as winning outcomes. Prizes or awards may be provided for winning outcomes, such as monetary payments (or representations thereof, such as prize of credits), or the like. As detailed below, one or more of the awards may have certain characteristics or features.

The gaming machine 100 also preferably includes one or more player input devices 108 (such as input buttons, plunger mechanisms, a touch-screen display, joystick, touch-pad or the like) that may be utilized by the player to facilitate game play. Also included in the player input devices 108 is a means for accepting monetary value. As illustrated in FIG. 1, a coin accepting mechanism 112 may be provided for accepting coins and a currency or bill acceptor 114 may be provided for accepting cash or paper currency, or a ticket reader may be provided for accepting and reading tickets or other representations of cash or currency. It is contemplated that other mechanisms may be provided for accepting a payment, such as credit card, ticket readers or input devices whereby a player may have funds paid from a remote account.

In one preferred embodiment, the gaming machine 100 includes a microprocessor or controller (not shown) for controlling the gaming machine, including receiving player input and sending output signals for controlling the various components of the machine 100 (such as generating game information for display by the display 104). The controller may be arranged to receive input such as a purchase/bet signal when a purchase/bet button is depressed, and a currency insert signal when a player inserts bills or coins. The controller may be arranged to send signals for determining winning combinations, for causing the coin hopper/dispenser, or printer, or an electronic fund transfer (EFT), to pay winnings, and to cause the display to display winning amount information. In addition, the controller is preferably arranged to determine if a round of game play has resulted in a win, and if so, the prize to be awarded to the player for that win.

The controller may be configured to execute machine readable code or "software" or otherwise process information, such as obtained from a remote server. Software or other instructions may be stored on a memory or data storage device. The memory may also store other information, such as pay table information. The gaming machine 100 may also include one or more random number generators for generating random numbers for generating random game outcomes, or such might be located remotely. For example, if the gaming machine 100 is a stand-alone machine configured to present a slot game or a video poker game, the random number generator(s) might be located at the machine. However, if the gaming machine 100 is used to present server-based or networked games, such as bingo games, the random number generator(s) might be located at the server.

In operation, the player may initiate game play by providing value, such as a wager. The wager may be made by activating one of the player input devices 108 such as a one credit button 116 which places a single credit purchase or wager or a max credit button 118 which places a maximum purchase or wager for that round of game play. The maximum purchase or wager is commonly defined as playing or betting an amount comprising a multiple of the value of a single purchase or wager up to a predefined upper purchase or bet limit or threshold. When the player actuates either the one credit button 116 or the max credit button 118, a wager is placed or purchase is made in that amount and the player's credit base is decreased by the number of credits wagered. The player's remaining credit base is typically displayed to the player by way of the display device 104. Upon making a purchase or placing a wager, the game may begin automatically or the player may join a game already in progress, or the player may initiate the game by activating another player input device, upon which the gaming machine 100 presents one or more game elements which are used to determine if the player has received a winning combination.

The gaming machine 100 generally includes a means for awarding a player a prize or winnings accumulated during game play. When a player obtains a winning outcome, the player is preferably paid prizes or awards in the form of stored credits, the amount of which is indicated to the player on the display 104. A "cash out" button may be provided for permitting a player to be paid the winnings or redeeming any credits initially paid into the gaming machine 100. The term "cash out" is used herein to define an event initiated by the player wherein the player receives a number of coins or currency that is equivalent to the value of the player's accrued credit base.

Typically when a player cashes out, the gaming machine 100 is configured to dispense a media or voucher, such as via a printer 114, which represents the cash-out value. The player may utilize this voucher at other gaming machine or convert the voucher to currency, such as at a cashier's station. However, depending upon the configuration of the gaming machine 100, the player might receive a cash or coin disbursement. For example, the gaming machine 100 might be configured to activate a coin hopper or coin handling device (not shown) which physically counts and delivers the proper number of coins to the player. The coin handling device is commonly configured to transport coins from a supply source (hopper or bin filled with coins) to a coin tray 124 or payout receptacle where the player physically receives the coins.

As indicated above, the gaming machine 100 may be configured as a stand-alone device, such as when the machine is configured to present a slot game or a video poker game. As detailed below, however, the gaming machine 100 may be a server-based or networked machine. For example, the gaming machine 100 may be configured to obtain game code or game outcome information from a remote server 130. The gaming machine 100 may also communicate with a remote accounting server and/or player tracking server, as is well known in the art.

It will be appreciated that the gaming machine and system described and illustrated in FIG. 1 is only exemplary of an environment for a game of the invention. For example, it is possible to implement the events or features of the invention via other types of gaming devices, such as computing devices such as home and laptop computers, including in an on-line, web-based environment. Additionally, a gaming machine or device 100 could take the form of a gaming table, a kiosk, iTV, a set-top box, or various mobile devices (such as a smart phone, PDA, media player, or tablet computer), etc.

One aspect of the invention is a viral gaming event or feature. Such an event may be presented at a gaming machine or device 100 such as described above.

The viral gaming event of the invention has two primary components: a viral gaming event trigger and viral gaming event spread or transmission. The viral gaming event is initiated by a trigger. The trigger may be random and/or be a particular event. For example, the trigger may be generated randomly at a server or a gaming machine. Alternatively, the trigger might occur when a particular game result occurs. Such an outcome might be the appearance of a particular symbol or a group of symbols, one or more winning game outcomes, certain non-winning outcomes, or various other events at a gaming machine or groups of gaming machines. Other events might comprise a certain number of credits wagered or a certain number of games played at a gaming machine or across a gaming system, or a group of symbols or outcomes received at a bank, or a jackpot received at one or more gaming machines, or a predefined time, place, or machine designated by the casino manager, for example.

Upon the trigger, the viral gaming event is initiated at one or more first gaming machines. Initiation of the event at a gaming machine is akin to "infection" of the machine with the viral gaming event. In one embodiment in which the trigger is a particular event at a gaming machine, the viral gaming event is initiated at that gaming machine. However, the event might be initiated at more than one gaming machine, such as gaming machines spread across the floor of a casino, the gaming machines of a bank of gaming machines or the like. Another salient characteristic is that the viral gaming event can "hop" to other qualified games or machines even before the event is consummated at the "infected" game or machine. Like a biological flu, this viral propagation during the incubation period speeds up the propagation and create more excitement for the players because of the multiple potential payouts that overlap and sequentially occurring all around the players. Even when multiple games are being played simultaneously at one gaming machine, the concurrent games can be susceptible to "infection" if they meet the criteria.

The viral gaming event may be coupled with or comprise content related to any number of events. For example, the viral gaming event might comprise a game, a bonus event, a bonus events, a secondary game or the like. Other contents such as a notification of a $3^{rd}$-party sponsored prize, a bonus alert, a promotional message, an advertisement, a group message, music, video, and the like can also be coupled with a viral gaming event. The viral gaming event might be the same for each gaming machine regardless of the type or manufacturer of the gaming machine. For example, the viral gaming event might comprise a particular animated bonus event, regardless of whether the gaming machine is a spinning reel slot machine or video poker machine. In other embodiment, the viral gaming event might vary depending upon the gaming machine, the game being played, the player, time, and/or other parameters. For example, the viral gaming event might comprise a bonus opportunity for a 1000 credit payout. At a video poker machine the viral gaming event might be presented as a poker game having the opportunity for a 1000 credit payout if a particular win is achieved, while at a slot machine the viral gaming event might be presented as a spin of the reels with the opportunity for a 1000 credit payout if a particular symbol or combination of symbols is achieved. The configuration of a game on a gaming machine can also cause a variation of viral gaming event. For example, a viral gaming event may present an opportunity for a player of a gaming machine to win a $10,000 progressive jackpot (a traveling progressive) at a $5-denominated slot game, and may present a $1,000 jackpot at a $0.25 denominated game. Such a traveling progressive jackpot offers a player of the infected gaming machine a limited time (the infection period) to win a portion of its funds, scaled up or down proportionately with the amount that a player bets.

The viral gaming event might comprise a single player/machine event or it might comprise a group play type event. In a group play implementation, a community bonus event could cause multiple viral bonus events to be subsequently generated at nearby slot machines associated with the group game. For example, when a community bonus wheel is spinning in a group game, it could generate a viral bonus event that "infects" nearby associated gaming machines and cause them to have bonus spins at a later time. The viral gaming event continues to hop or spread to other qualified games until a termination event occurs. Also, the viral gaming event might result in an award, such as a bonus award, or it might have one or more outcomes that do not result in any additional award. The value of the awards that may be won at a particular machine may be based upon the size of player's wager, a side wager, a random event, or the like.

The viral gaming event may be presented via the main display of a gaming machine, via a secondary display or by one or more displays or devices common to one or more gaming machines. The viral gaming event might require one or more player inputs. The viral gaming event might be presented without a requirement for a further wager or might require a player to place a wager or an additional wager. In one embodiment, a player may be required to place a side wager in order to be eligible for the viral gaming event to spread to their machine.

In accordance with the invention, the viral gaming event preferably spreads from one or more first gaming machines to one or more other gaming machines over time. In particular, after the viral gaming event is initiated at the one or more first gaming machines at a first time T1, it spreads to and is initiated at one or more additional gaming machines at a time T2. The time delay between when the viral gaming event is initiated at the one or more first gaming machines and the one or more additional gaming machines may vary. For example, the time delay could be very short (seconds) or long (minutes, hours, etc.).

In addition, the viral gaming event may spread beyond one or more second gaming machines to other gaming machines. As one example, the total number of gaming machines "infected" over time may be bell curved (i.e. one or more gaming machines at time T1, increasing to a higher number of gaming machines at a time T2 and then decreasing to a fewer number of machines at a time T3). The number of gaming machines which are infected may also be random or have various other patterns, such as increasing linearly, geometrically, or exponentially over time until an end time.

It will also be appreciated that the rate of spread of the viral gaming event may vary. For example, the viral gaming event may spread from one or more first gaming machines at a time T1 to one or more second gaming machines in a time T2, and from the one or more second gaming machines to one or third gaming machines in a time T3, where the time intervals between T2/T1 and T3/T2 differ.

In one embodiment, the viral gaming event preferably ends or stops spreading at some point in time. When the viral gaming event ends, it preferably no longer spreads to additional gaming machines. The spread of the viral gaming event may end after a certain number of gaming machines have been infected, after a period of time from when the one or more first gaming machines were infected, until a pool of award money has been exhausted, or based upon various other criteria. In a preferred embodiment, the viral gaming event ends before all gaming machines in a particular location or environment are infected, whereby the viral gaming event is perceived as a special or bonus event as to those machines which receive it (compared to those which do not).

The viral gaming event may end at a particular machine once the event has been played or presented at that machine (though the event may still be spreading to other machines and/or games before the consummation of the viral gaming event at the current gaming machine/game). If the viral gaming event has a long duration, such as a group-type event, then the viral gaming event might end at each machine at a termination time. For example, once a viral gaming event is initiated at a gaming machine it may continue until the entire viral gaming event is terminated at all machines, as detailed below.

Once each gaming machine is infected, the viral gaming event is presented at that gaming machine. As indicated, the viral gaming event which is presented at each machine may be unique (i.e., tailored to a player or a game), or may be similar the event presented at other gaming machines.

Figure 2:
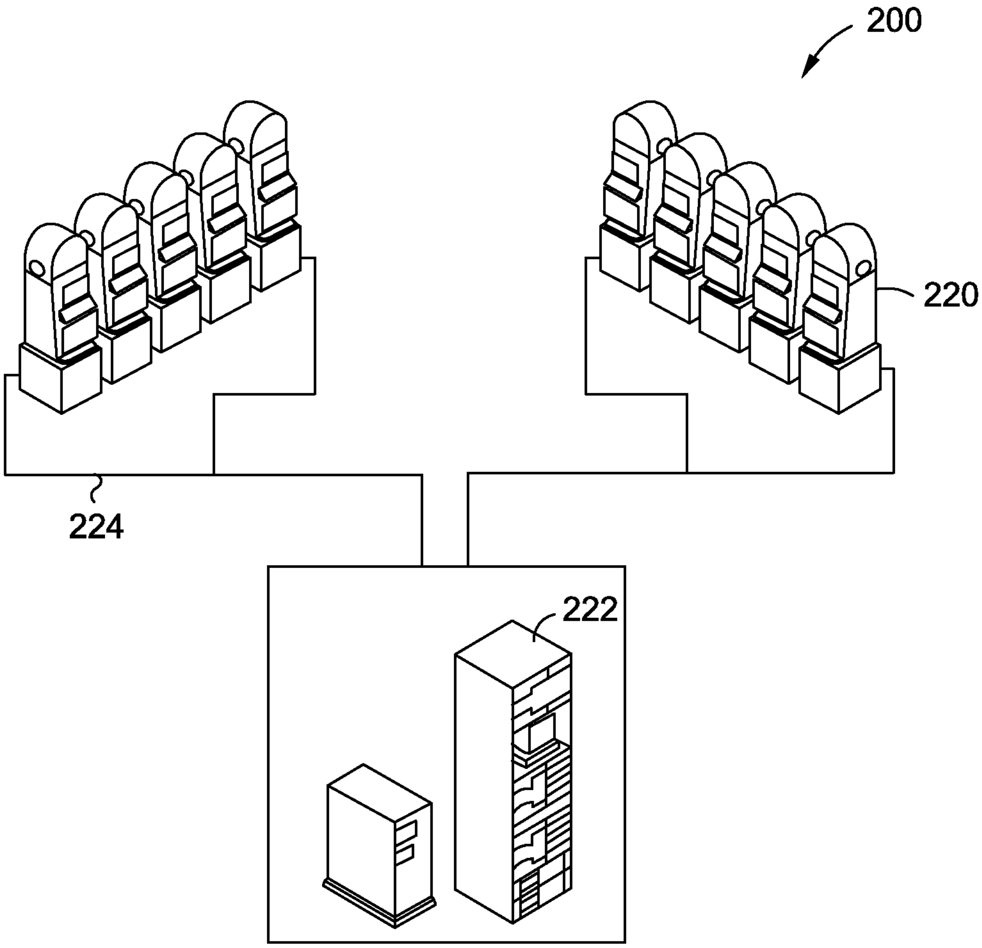
FIG. 2 illustrates a gaming system configured to present viral gaming events.

In a preferred embodiment, the viral gaming event is implemented in a gaming system including multiple gaming machines. Preferably, the event is controlled by one or more system controllers. The system controller might comprise a server which is in communication with the gaming machines. FIG. 2 illustrates one embodiment of such a system 200. The system 200 includes a plurality of gaming machines 220. Those gaming machines 220 may have the same or different configurations, may be produced by the same or different gaming machine manufacturers and may be configured to present the same or different games. The gaming machines 220 might be located, for example, in the same area of a casino, in various areas of a casino, or in multiple casinos (or other locations). The gaming machines 220 may be arranged in various configurations. As illustrated, various of the gaming machines 220 may be arranged into rows or banks, but they might also be arranged in other fashions. While in some arrangements the propagation may depend on or be linked to the physical arrangement of the gaming machines, such as not necessary. For example, in the case of mobile devices, such devices might just have to be at the right place at the right time, or possess the right viral triggering characteristics in order for the viral event to spread to them.

The system 200 preferably comprises a controller or server 222. The server 222 may comprise a computing device configured to execute machine readable code. In a preferred embodiment, the server 222 is in communication with the gaming machines 220 via one or more communication links 224. Such links 224 might comprise wired or wireless links, or combinations thereof.

In one embodiment, the server 222 may initiate a viral gaming event trigger. For example, the server 222 might monitor coin-in/credit wager data at the gaming machines 220. If a certain threshold is met, the server 222 may initiate the viral gaming event. Following the decision to instantiate the viral gaming event, the server 222 may determine a propagation pattern, one or more seed gaming machines, and the direction and rate of propagation. The server 222 might select one or more gaming machines 220 at which the event is to be initiated. The server 222 might receive feedback that the triggers that took place, and then spread the viral gaming event to other gaming machines 220.

In another embodiment, a viral gaming event might be triggered at a gaming machine or machines 220. The server 222 is then notified of the triggering event. The server 222 might then determine the propagation pattern, and spread the viral gaming event to other gaming machines 220. This is a hybrid implementation in which the triggering event is initiated by a game or gaming machine and then propagates by a server.

In one embodiment, the server 222 might utilize an existing communication network which links the gaming machines 220, such as a player tracking or accounting system. However, in environments where gaming machines are associated with different systems (such as those of different manufacturers), the server 222 might communicate with each of those different gaming machines via other communication links. Such links might be direct to the gaming machines or might be via the servers of the other systems. If the game or gaming machine supports a standard communication protocol, no protocol translation is needed. However, if the game or gaming machine does not support a standard protocol, a protocol mediator server may be needed to translate the communication commands to the language that the gaming machine supports.

It is also possible for the viral gaming event to be presented by gaming machines in a peer-to-peer environment. In this configuration, each gaming machine may be configured with a viral gaming event application. Each application may determine if a viral gaming event trigger has occurred. If so, that gaming machine may initiate the viral gaming event and then send a message directly to one or more other selected gaming machines to spread the viral gaming event. In a peer-to-peer communication approach, the triggering event takes place at a game and then propagates directly to other qualified games or gaming machines without the need for a central server. A manual approach in which a casino manager initiates the triggering event can take place whether the viral gaming event is constructed via a client-server or a peer-to-peer architecture.

A variety of additional aspects of the invention will now be described.

In one embodiment, spread of the viral gaming event may be random. In other configurations, it may be controlled, such as based upon various criteria. For example, the viral gaming event may be spread from one or more first gaming machines to other gaming machines that have or are experiencing a lower rate of game play. A player tracking or other system may be used to monitor game play at gaming machines across a system. Certain machines, such as in certain areas of a casino, may experience lower rates of play. This information may be provided to the viral gaming event server and the viral gaming event server may cause the viral gaming event to be initiated at or spread to those machines. The viral gaming event may thus be used as a tool to entice players to play gaming machines which are otherwise not being played.

Patterns of infection or rates of infection may also be varied by other factors. For example, the spread of a viral gaming event may be a different rate during the day versus night, or during periods of high gaming activity versus low activity.

In another embodiment, other sensors or devices may be used to provide information to the viral gaming event system for use in controlling the spread of the viral gaming event. For example, instead of using game play information from a player tracking system, the viral gaming system might obtain information from one or more cameras. These cameras may provide visual information regarding the gaming floor, such as information regarding patterns of patron movement, gaming machine occupancy and the like. This information may be analyzed and used by the viral gaming event server in determining the propagation of the viral gaming event. Such camera or other gathered information may also be used during the spread of the gaming event to determine if desired goals are being met (i.e. a feedback control) and, as detailed below, used to change various viral gaming event metrics during the event to achieve those goals.

The viral gaming server may utilize various control strategies. For example, the viral gaming server may employ a pre-programmed strategy in determining the viral gaming event. This strategy might comprise, for example, locating gaming machines which are inactive and spreading the viral gaming event to those machines. The control strategy might include a learning component. For example, the viral gaming event server may employ strategies and feedback in order to modify control strategies. Such strategies might be used and modified, for example, to achieve certain goals such as even player distribution across a gaming floor, maximized gaming machine occupancy or the like.

As one aspect of viral gaming event spread, different viral gaming events may be presented at different times and to different machines. As indicated above, different viral gaming events may be presented at different gaming machines. For example, viral gaming events offering differing levels of awards may be offered at different gaming machines, such as to manipulate play patterns. As one example, viral gaming events with low awards may be initiated at gaming machines that are active and viral gaming events with high awards may be initiated at gaming machines that are inactive (so as to attempt to draw new players to those inactive machines).

As indicated, the spread of the viral gaming event from machine to machine may be based upon various criteria or controls. As other examples, the viral gaming event might spread based upon a geometric progression (a randomly selected or predetermined geometric pattern). Such a pattern might comprise a propagation direction and rate of propagation. The viral gaming event might also spread to proximate gaming machines or the like. In another embodiment, the viral gaming event may spread to players in certain groups or meeting certain qualifications. For example, the viral gaming event may spread to all players having certain common metrics associated with the player tracking/profile information.

In one embodiment, the viral gaming event may only spread to gaming machines which are in active play or may spread based upon other criteria. For example, the viral gaming event might only spread to games where players have met certain qualifying requirements (such as duration of play, minimum player loyalty points, Gold Club members, etc.).

However, in other embodiments, the viral gaming event may spread to inactive gaming machines or may spread based upon other/external criteria than player qualification. As indicated, for example, the viral gaming event may be spread to gaming machines with a low level of game play. In the event a gaming machine is inactive, it is possible that the viral gaming event permits a player to achieve winnings without a wager. For example, a player might travel to a gaming machine which has been infected and the player may be permitted to play a bonus viral gaming event with the opportunity for winnings without any wager.

In one embodiment, when a gaming machine is infected with the viral gaming event (or the event is initiated at that gaming machine), notification may be provided to the player thereof and/or potential players via various messaging technologies. For example, various types of visible, audible or other alerts such as email, text messages to a player's mobile device (such as a phone or PDA) may be provided. Such alerts might comprise notification via the main display of the gaming machine, a secondary display, various lights or speakers. In one embodiment, the alert might comprise an audible notification that the gaming machine has been "infected". Preferably, such alerts can be used by players or potential players to track or monitor to the spread of the viral gaming event.

In one embodiment, path lighting or other elements might be used to display the spread of the viral gaming event. Path lighting in a floor, ceiling or the like may define multiple paths between gaming machines of a casino. The particular paths of spread may be illuminated, thus providing players with a visual indication of how the viral gaming event is spreading. Other types of alerts or indicators may be provided, such as laser light, sound propagation, synchronized vibration of the chairs, vibrating the player's mobile device, text messaging to the player's mobile device, and the like.

Figure 3:
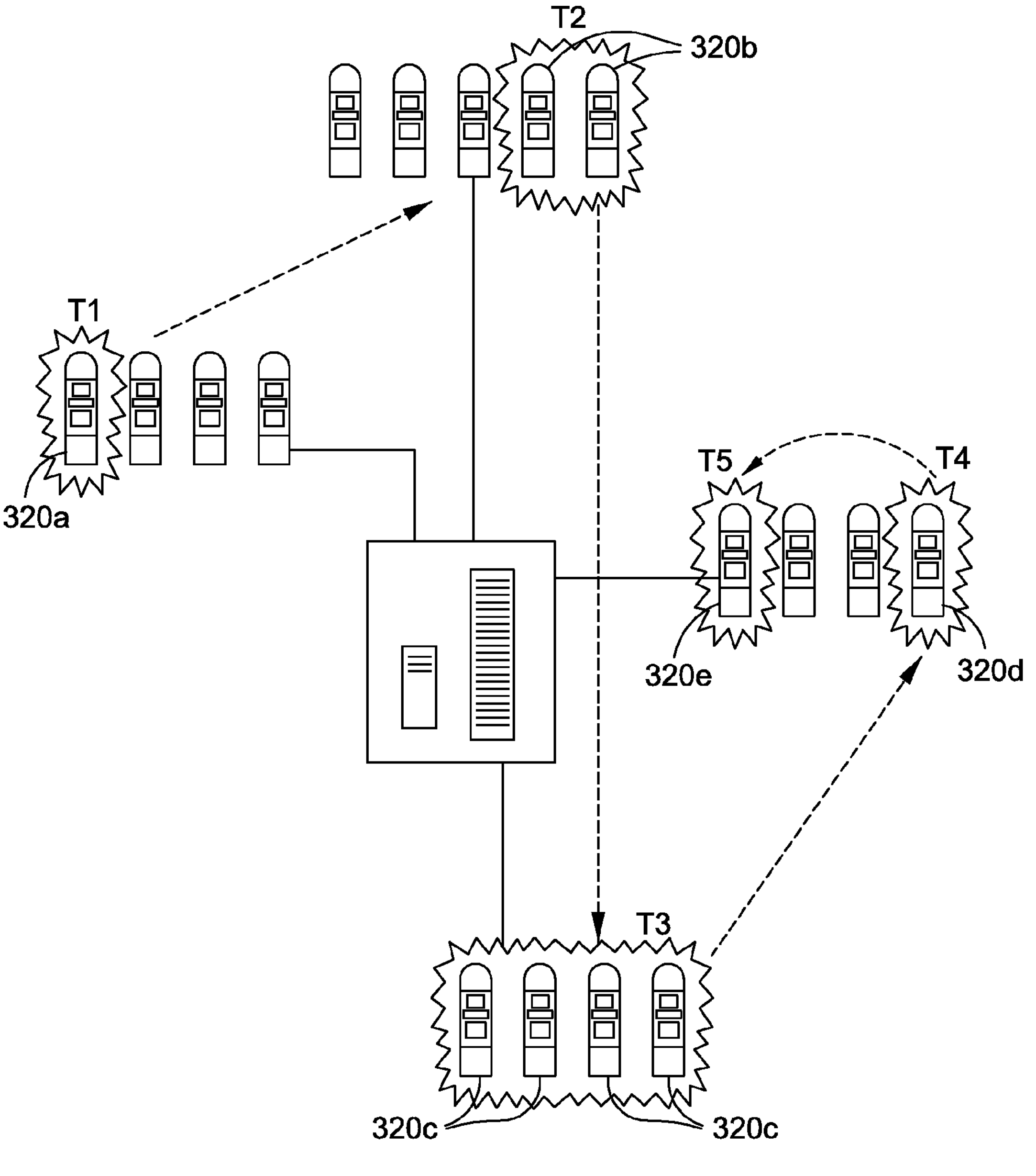
FIG. 3 illustrates propagation of a viral gaming event to multiple gaming machines.

FIG. 3 illustrates one example of this feature of the invention. As illustrated, the viral gaming event was initiated at a single gaming machine 320*a*. An alert notifies any player of that machine and other players in the area that the viral gaming event has been initiated at that machine. The viral gaming event then spread to two more gaming machines 320*b* in a different location, then an entire bank of gaming machines 320*c* in yet another location, then to a single gaming machine 320*d* in yet another bank of gaming machines, and finally to a last gaming machine 320*e* in that same bank of gaming machines. Each time a gaming machine is infected and/or the viral gaming event is initiated at the gaming machine, an alert is preferably provided. In this manner, players can track the spread of the viral gaming event.

In one embodiment, it is possible for there to be a time delay between when a gaming machine is infected with the viral gaming event and when it is presented at the gaming machine. This might be referred to as an incubation period. For example, the viral gaming event might spread to one or more second gaming machines. An alert may be provided to the players thereof that the gaming machines have been infected. However, the viral gaming event itself might be presented immediately or after some period of time. In this manner, a player knows that the machine is infected and the viral gaming event will be presented, but does not know when. This entices the player to continue to play the gaming machine in anticipation of the viral gaming event being presented. During the incubation period, the viral gaming event may continue to propagate and infect other games. Thus, the viral gaming event may overlap at two or more games/gaming machines (as compared to an embodiment wherein the virus spreads sequentially and an event at one or more games/gaming machines must end before another event starts at other games/gaming machines).

As one aspect of the invention, viral gaming event data may be gathered and analyzed. Information may be gathered regarding the results of viral gaming events at each individual machine, the number of viral gaming events initiated vs. those which were played (i.e. were inactive machines played when the event was initiated at the machine), etc. This information may be used to determine how future viral gaming events are initiated or spread, the awards to be offered and the like.

It will be appreciated that the various features of the invention may be utilized in various combinations. For example, the viral gaming event may be configured to spread at differing rates over time, coupled with feedback control which causes the viral gaming event to spread to particular gaming machines based upon rate of game play. Further, multiple viral gaming events can occur on a casino floor, allowing such hybrid events as a game being infected with more than one viral gaming event at one time. This allows the player to be eligible for multiple bonuses, for instance.

In accordance with the invention, numerous advantages are realized. The present invention substantially increases the excitement of playing games, including wagering games. In particular, players know that a bonus or other gaming event which is additional to their base gaming event may be triggered and presented at any time. More importantly, even if such an event is not initiated at their gaming machine, if that event is initiated at another gaming machine it may still spread to their gaming machine. Once a gaming machine is infected, players can anticipate infection of other machines. Thus, substantial anticipation is created while the viral gaming event spreads through the various gaming machines.

An additional advantage of the viral gaming event is that it may be used to increase gaming play. Aside from the inherent excitement that the event presents, the viral gaming event may be particularly spread to gaming machines having low gaming activity. This spread may entice players to follow the spread of the viral gaming event to those machines. As players move to those machines, game play is increased on those gaming machines.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of presenting a viral gaming event at a plurality of gaming machines comprising:
- determining, at a server, whether to initiate a viral gaming event;
- triggering a viral gaming event;
- initiating said viral gaming event at one or more first gaming machines at a time T1;
- spreading said viral gaming event to one or more second gaming machines, said spreading of the viral gaming event to the one or more second gaming machines being triggered by an event at the one or more first gaming machines; and
- presenting said viral gaming event at said one or more second gaming machines at a time T2 which is later than said time T1, wherein the said spreading of the viral gaming event from the said one or more first gaming machines to the said one or more second gaming machines occurs while the viral gaming event at the said one or more first gaming machines is active.

2. The method in accordance with claim 1 wherein said one or more first gaming machines and one or more second gaming machines are configured to present wagering games and said viral gaming event comprises a bonus gaming event.

3. The method in accordance with claim 2 wherein said wagering games are configured to award winnings for winning outcomes and said bonus gaming event is configured to award a bonus award separate from said winnings of said wagering games.

4. The method in accordance with claim 1 wherein said triggering comprises a receiving a predetermined outcome at one of said plurality of gaming machines.

5. The method in accordance with claim 4 wherein said predetermined outcome is a jackpot event.

6. The method in accordance with claim 1 further comprising spreading said viral gaming event to one or more third gaming machines and presenting said viral gaming event at said one or more third gaming machines at a time T3 which is later than said time T2.

7. The method in accordance with claim 1 wherein said one or more first gaming machines are configured to present wagering games of a first type and said one or more second gaming machines are configured to present wagering games of a second type.

8. The method in accordance with claim 1 wherein one or more of said first and second gaming machines are of different types, systems or networks.

9. The method in accordance with claim 1 further comprising selecting said one or more second gaming machines before the step of spreading said viral event to said one or more second gaming machines.

10. The method in accordance with claim 9 wherein said selecting comprises assessing a level of gaming activity at said plurality of gaming machines and selecting one or more of said plurality of gaming machines at which gaming activity is low.

11. The method in accordance with claim 9 wherein said selecting comprises a random selection process.

12. A gaming system comprising:
- a plurality of gaming machines, each gaming machine configured to present at least one wagering game having at least one outcome defined as a winning outcome having an award associated therewith;
- a viral gaming event server configured to determine whether to initiate a viral gaming event; and
- at least one communication link between said viral gaming event server and each of said plurality of gaming machines;
- said viral gaming event server configured to:
  - initiate a viral gaming event at one or more first gaming machines of said plurality of gaming machines at a time T1; and initiate said viral gaming event at one or more second gaming machines of said plurality of gaming machines at a second time T2 which is later than said time T1, wherein the initiation of the viral gaming event at the said one or more second gaming machines occurs while the viral gaming event at the said one or more first gaming machines is active, and wherein initiation of the viral gaming event at the said one or more second gaming machines is triggered by an event at the one or more first gaming machines.

13. The gaming system in accordance with claim 12 wherein said viral gaming event server is configured to detect a viral gaming event trigger and initiate said viral gaming event at said one or more first gaming machines in response to said trigger.

14. The gaming system in accordance with claim 12 further comprising at least one camera which captures image information regarding one or more of said plurality of gaming machines, said viral gaming event server configured to utilize analyzed image information in determining the one or more second gaming machines at which said viral gaming event is initiated.

15. The gaming system in accordance with claim 12 wherein said one or more second gaming machines are in a defined propagation path from said one or more first gaming machines.

16. The gaming system in accordance with claim 12 including at least one alert device configured to provide information regarding a path of spread of said viral gaming event from said one or more first gaming machines to said one or more second gaming machines.

17. The gaming system in accordance with claim 16 wherein said at least one alert device comprises a path lighting system.

18. The gaming system in accordance with claim 16 wherein said at least one alert device comprises a message to a mobile device.

19. The gaming system in accordance with claim 12 wherein said viral gaming server comprises a feedback control configured to determine said one or more second gaming machines based upon desired game play goals.

20. The gaming system in accordance with claim 12 wherein said viral gaming event comprises a bonus event offering a potential bonus award.

21. The gaming system in accordance with claim 12 wherein said viral gaming event comprises a promotional message.

22. The gaming system in accordance with claim 12 wherein said one or more first and second gaming machines meet one or more eligibility requirements.

23. The gaming system in accordance with claim 12 wherein players of said one or more first and second gaming machines meet one or more eligibility requirements.

24. The gaming system in accordance with claim 23 further comprising at least one game player tracking server in communication with said plurality of gaming machines and obtaining player eligibility information from said gaming machines, wherein said viral gaming event server is in communication with said player tracking server.

25. The gaming system in accordance with claim 12 wherein said viral gaming event server is configured to initiate said viral gaming event at one or more third gaming machines at a time T3 which is later than said time T1.

* * * * *